United States Patent
Suzuki et al.

(10) Patent No.: US 8,257,783 B2
(45) Date of Patent: Sep. 4, 2012

(54) MAGNETIC DISK AND METHOD OF MANUFACTURING THE SAME

(75) Inventors: Kota Suzuki, Hokuto (JP); Hiroshi Tomiyasu, Nakakoma-gun (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 916 days.

(21) Appl. No.: 12/295,011

(22) PCT Filed: Mar. 29, 2007

(86) PCT No.: PCT/JP2007/056995
§ 371 (c)(1),
(2), (4) Date: Nov. 18, 2008

(87) PCT Pub. No.: WO2007/116812
PCT Pub. Date: Oct. 18, 2007

(65) Prior Publication Data
US 2011/0171492 A1    Jul. 14, 2011

(30) Foreign Application Priority Data

Mar. 29, 2006 (JP) .................................. 2006-090835

(51) Int. Cl.
*G11B 5/66* (2006.01)
(52) U.S. Cl. .................... 427/131; 508/207; 428/833.3
(58) Field of Classification Search .................... None
See application file for complete search history.

(56) References Cited

U.S. PATENT DOCUMENTS

| | | | | |
|---|---|---|---|---|
| 5,425,988 A | * | 6/1995 | Ogawa et al. | 428/333 |
| 5,443,901 A | * | 8/1995 | Mino et al. | 428/336 |
| 6,099,981 A | | 8/2000 | Nishimori | |

FOREIGN PATENT DOCUMENTS

| | | |
|---|---|---|
| JP | 62-66417 A | 3/1987 |
| JP | 62-279520 A | 12/1987 |
| JP | 3-134818 A | 6/1991 |
| JP | 4-117621 A | 4/1992 |
| JP | 4-298817 A | 10/1992 |
| JP | 2005-187656 A | 7/2005 |

* cited by examiner

*Primary Examiner* — Holly Rickman

(57) ABSTRACT

In a magnetic disk including a magnetic layer, a protecting layer and a lubricating layer on a substrate, the lubricating layer is formed by a self assembly monolayer. A material of the self assembly monolayer is a hydrocarbon-based silane agent or a partial fluorinated hydrocarbon-based silane agent. The magnetic layer and the protecting layer (P) are sequentially formed on the substrate, and then the substrate on which the magnetic layer and the protecting layer (P) are formed is immersed in a solution containing the hydrocarbon-based silane agent or the partial fluorinated hydrocarbon-based silane agent, and thus a lubricating layer (L) is formed on the protecting layer (P).

4 Claims, 1 Drawing Sheet

MAGNETIC DISK AND METHOD OF MANUFACTURING THE SAME

TECHNICAL FIELD

The present invention relates to a magnetic disk to be loaded onto a magnetic disk device such as a hard drive disk and a method of manufacturing the same.

BACKGROUND ART

Conventionally, a magnetic disk to be loaded onto a magnetic disk device such as a hard disk drive (HDD) has a protecting layer and a lubricating layer provided on a magnetic recording layer formed on a substrate in order to maintain a durability and a reliability of the magnetic disk. In particular, the lubricating layer to be used on an uppermost surface is demanded to have various properties such as a long-term stability, a chemical material resistance, a frictional property and a heat resisting property.

For the demand, conventionally, a perfluoropolyether based lubricant has often been used as a lubricant for the magnetic disk. For example, as disclosed in JP-A-62-66417 (Patent Document 1), there has been known a magnetic recording medium to which a perfluoroalkylpolyether based lubricant having a structure of $HOCH_2$—$CF_2O$—$(C_2F_4O)$p-$(CF_2O)$q-$CH_2OH$ is applied.

As a commercial product of the perfluoropolyether based lubricant, there is often used a FOMBLIN Z based lubricant manufactured by Solvay Solexis Co., Ltd., which has a high heat resistance and a long-term stability. In order to remove an impurity from the commercial product of the lubricant or to properly distribute a molecular weight of the lubricant because the lubricant is a polymeric material, various purifications have been made and the lubricant has been used for the magnetic disk.

Patent Document 1: JP-A-62-66417

DISCLOSURE OF THE INVENTION

Problems to be Solved

In recent years, a storage capacity of the magnetic disk device such as an HDD has been increased rapidly. Recently, a magnetic disk device using a Load Unload (LUL) system has been introduced in place of a conventional Contact Start and Stop (CSS) system.

In the LUL system, a magnetic head is retreated to a tilting table positioned on an outside of a magnetic disk, which is referred to as a lamp, at time of stop and the magnetic head is slid over the magnetic disk from the lamp to carry out a recording and reproducing operation after the magnetic disk starts a rotation at time of starting.

A serial operation is referred to as an LUL operation. Since the LUL system can maintain a larger recording and reproducing region over the magnetic disk than that in the CSS system, it is preferable for an increase in an information capacity.

Moreover, it is not necessary to provide a concavo-convex shape for the CSS on a magnetic disk surface. Therefore, the magnetic disk surface can be considerably smoothened. Consequently, a floating amount of the magnetic head can be reduced still more. Thus, an S/N ratio of a recording signal can be increased and the system is thus suitable.

Due to a reduction by one step in the floating amount of the magnetic head with an introduction of the LUL system, it has been demanded that the magnetic disk is stably operated in a low floating amount of 10 nm or less.

When the magnetic head is caused to carry out a floating flight over the magnetic disk surface in the low floating amount, however, there is a problem in that a fly stiction failure or a head corrosion failure is often generated. The fly stiction failure causes a floating posture or a floating amount to be irregular in the floating flight of the magnetic head, and causes an irregular fluctuation in a reproducing output. According to circumstances, the magnetic disk and the magnetic head come in contact with each other during the floating flight so that a head crush fault is caused in some cases.

The corrosion failure hinders a recording and reproducing operation due to the corrosion of the element portion of the magnetic head. According to circumstances, the recording and reproducing operation cannot be carried out or the corroded element is swollen so that the surface of the magnetic disk is damaged during the floating flight in some cases.

The inventors obtained the knowledge that the failure which has been remarkable in a recent magnetic disk is caused by the following mechanism.

When the magnetic head has a small floating amount which is equal to or smaller than 10 nm, a lubricating surface on a magnetic disk surface is repetitively subjected to adiabatic compression and adiabatic expansion through an air molecule during the floating flight by the magnetic head so that the lubricating layer is repetitively subjected to heating and cooling easily. Therefore, it is easy to promote a lubricant constituting the lubricating layer to have a low molecular weight.

When the lubricant is changed to have the low molecular weight, fluidity is increased so that an adhesion to the protecting layer is deteriorated. It is supposed that the lubricant having the increased fluidity is transferred and deposited onto the magnetic head having a very narrow positional relationship and thus a floating posture becomes unstable, resulting in the generation of a fly stiction failure.

In particular, a magnetic head comprising an NPAB (negative pressure) slider, which has recently been introduced, easily sucks the lubricant by a great negative pressure generated on a lower surface of the magnetic head. Therefore, it is supposed that a transfer and deposition phenomenon is promoted.

The transferred lubricant generates an acid such as a fluoric acid in some cases, and a device portion of the magnetic head is corroded in some cases.

In particular, a head loading a magnetoresistive-effect element is corroded easily.

Moreover, the inventors obtained the knowledge that the LUL system promotes the generation of the failures.

In case of the LUL system, the magnetic head is not slid in contact over the magnetic disk surface differently from the CSS system. Therefore, it was found that the lubricant transferred and deposited once onto the magnetic head is hard to transfer and remove toward the magnetic disk side.

In the conventional CSS system, the lubricant transferred to the magnetic head is easily cleaned through sliding in contact with a CSS region of the magnetic disk. For this reason, it can be considered that the failure is not remarkable.

In order to increase a response speed of the magnetic disk device, recently, a rotating speed of the magnetic disk is increased. Conventionally, the number of rotations of a 2.5 inch type magnetic disk device having a small size which is suitable for mobile uses is approximately 4200 rpm. Recently, a rotation is carried out at a high speed of 5400 rpm or more to enhance a response characteristic.

There is an obvious phenomenon in which the lubricating layer is migrated by a centrifugal force generated by the rotation and a film thickness of the lubricating layer is thus nonuniform in the magnetic disk surface when the magnetic disk is rotated at the high speed.

In recent years, the magnetic disk device has also been used in a car navigation system, for example, in addition to a storage device of a conventional personal computer. With a diversification of uses, a resistance to an environment which is required for the magnetic disk has been very severe.

The lubricant used in the lubricating layer to be an uppermost surface of the magnetic disk greatly influences durability of the magnetic disk. As described above, a perfluoropolyether based lubricant on the market is currently used often as the lubricant for the magnetic disk. The perfluoropolyether based lubricant on the market contains a polymer component and has a molecular weight distribution caused by a synthesizing method thereof. Even if various purifying methods are used, it is almost impossible to completely carry out a control into a single molecular weight. For this reason, there is a problem in that the molecular weight distribution is provided to some degree also after the purification and the control is hard to perform.

In a method of forming the lubricating layer by using the lubricant, moreover, the magnetic disk is immersed into a solution having the lubricant dissolved therein (a dipping method) and a heating treatment and a UV processing are executed to have an adhesion to the protecting layer after pull-up.

However, the lubricating layer thus formed has two types of a chemical adsorbing layer and a physical adsorbing layer, and it is very hard to completely control them.

The physical adsorbing layer is easily removed by a spin migration through the rotation of the magnetic disk or an evaporation.

On the other hand, it is difficult to completely cover the surface of the protecting layer with only the chemical adsorbing layer (a stationary phase through a chemical adsorption).

In short, in a conventional method of forming a lubricating layer for a magnetic disk, there is a problem in that it is hard to uniformly form a lubricating layer on the surface of the magnetic disk and a long-term stability of the lubricating layer thus formed is poor. Consequently, this inhibits an implementation of a magnetic disk having a high reliability in a low floating amount of the magnetic head with a recent increase in a recording density.

The present invention has been made in consideration of the conventional problems and has an object to firstly provide a magnetic disk which can easily control a formation of a lubricating layer and includes a lubricating layer having a high uniformity, to secondly provide a magnetic disk which includes a lubricating layer having a high durability and is excellent in a long-term reliability, and to thirdly provide a magnetic disk which is suitable for a magnetic disk device using an LUL (load unload) system.

Means for Solving the Problems

The inventor vigorously investigated new means for forming a lubricating layer and found that the problems can be solved by the following invention, and thus completed the present invention.

More specifically, the present invention has the following structures.

(Structure 1) In a magnetic disk comprising a magnetic layer, a protecting layer and a lubricating layer on a substrate, the lubricating layer is formed by a self assembly monolayer.

(Structure 2) In the magnetic disk according to the structure 1, a material of the self assembly monolayer is a hydrocarbon-based silane agent or a partial fluorinated hydrocarbon-based silane agent.

(Structure 3) In a magnetic disk comprising a magnetic layer, a protecting layer and a lubricating layer on a substrate, the lubricating layer is formed by using a hydrocarbon-based silane agent or a partial fluorinated hydrocarbon-based silane agent.

(Structure 4) In the magnetic disk according to any of the structures 1 to 3, the magnetic disk is loaded onto a magnetic disk device using a load unload system.

(Structure 5) In a method of manufacturing a magnetic disk comprising a magnetic layer, a protecting layer and a lubricating layer on a substrate, the magnetic layer and the protecting layer are sequentially formed on the substrate and then the substrate on which the magnetic layer and the protecting layer are formed is immersed in a solution containing a hydrocarbon-based silane agent or a partial fluorinated hydrocarbon-based silane agent, and thus a lubricating layer is formed on the protecting layer.

Advantage of the Invention

According to a first aspect of the present invention, the magnetic disk includes a magnetic layer, a protecting layer and a lubricating layer on a substrate, and the lubricating layer is formed by a self assembly monolayer. Therefore, the film thickness of the lubricating layer can be accurately controlled, and the film has a high uniformity and a high durability. Consequently, it is possible to provide a magnetic disk having a high reliability for a long period of time.

According to a second aspect of the present invention in accordance with the first aspect, a material of the self assembly monolayer is a hydrocarbon-based silane agent or a partial fluorinated hydrocarbon-based silane agent. In addition to the advantage obtained by the present invention according to the first aspect, it is possible to easily regulate the film thickness of the lubricating layer and to enhance a heat resistance by changing lengths of main chains of the materials. By varying end portions of the materials, moreover, it is possible to change a membrane of the surface of the lubricating layer. For example, it is possible to set the surface of the lubricating layer to have a low energy and to suppress an adhesion of an oil component or an ion which is present in an atmosphere in the magnetic disk device such as an HDD and other chemical substances.

According to a third aspect of the present invention, a magnetic disk includes a magnetic layer, a protecting layer and a lubricating layer on a substrate, and the lubricating layer is formed by using a hydrocarbon-based silane agent or a partial fluorinated hydrocarbon-based silane agent. Consequently, it is possible to easily regulate a film thickness of the lubricating layer and to enhance a heat resistance, and furthermore, to change the membrane of the surface of the lubricating layer, for example, to set the surface of the lubricating layer to have a low energy. Moreover, it is possible to accurately control the film thickness of the lubricating layer by using the materials and to obtain a lubricating layer formed by a self assembly monolayer having a high uniformity of the film and a high durability. Thus, it is possible to provide a magnetic disk having a high reliability for a long period of time.

According to a fourth aspect of the present invention, it is possible to provide the magnetic disk which is suitable for a magnetic disk device using a load unload system.

According to a fifth aspect of the present invention, in a method of manufacturing a magnetic disk including a magnetic layer, a protecting layer and a lubricating layer on a substrate, the magnetic layer and the protecting layer are sequentially formed on the substrate and then the substrate on which the magnetic layer and the protecting layer are formed is then immersed in a solution containing a hydrocarbon-based silane agent or a partial fluorinated hydrocarbon-based silane agent, and thus a lubricating layer is formed on the protecting layer. Consequently, it is possible to easily regulate a film thickness of the lubricating layer and to enhance a heat resistance, and furthermore, to change the membrane of the surface of the lubricating layer, for example, to set the surface of the lubricating layer to have a low energy. Moreover, it is possible to accurately control the film thickness of the lubricating layer by using the silane material and to form a lubricating layer constituted by a self assembly monolayer having a high uniformity of the film and a high durability. Thus, it is possible to manufacture a magnetic disk having a high reliability for a long period of time.

Figure 1:
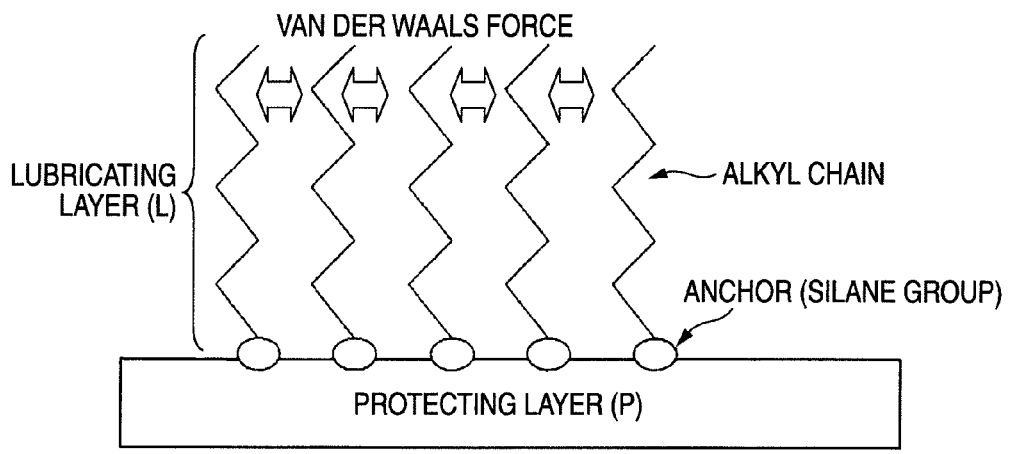
FIG. 1 is a schematic view showing an image of a lubricating layer formed on a protecting layer according to the present invention.

DESCRIPTION OF THE DESIGNATIONS 10 disk substrate
20 bonding layer
30 soft magnetic layer
40 ground layer
50 vertical magnetic recording layer
60 protecting layer
70 lubricating layer

BEST MODE FOR CARRYING OUT THE INVENTION

An embodiment according to the present invention will be described below in more detail.

As an embodiment of a magnetic disk according to the present invention, the magnetic disk comprises a magnetic layer, a protecting layer and a lubricating layer on a substrate, and the lubricating layer is formed by a self assembly monolayer.

The self assembly monolayer has such a structure that one of ends (anchors) of each molecular of a material forming the monolayer is bonded (chemically bonded) to a ground (a protecting layer in the present invention) and the other end is arranged toward a film surface side, and the respective molecules carry out an interaction by an intermolecular force (Van der Waals force). The lubricating layer is formed by the self assembly monolayer. Therefore, a film thickness of the lubricating layer can be accurately controlled, the film can have a high uniformity and a high durability.

Therefore, it is possible to provide a magnetic disk having a high reliability for a long-period of time.

In the present invention, it is preferable that a material of the self assembly monolayer should be a hydrocarbon based silane agent or a partial fluorinated hydrocarbon based silane agent. The material of the self assembly monolayer is set to be the hydrocarbon based silane agent or the partial fluorinated hydrocarbon based silane agent. By changing lengths of main chains of the materials, consequently, it is possible to easily regulate the film thickness of the lubricating layer and to enhance a heat resistance.

By varying the end portions of the materials, moreover, it is possible to change a membrane of the surface of the lubricating layer. For example, it is possible to set the surface of the lubricating layer to have a low energy and to suppress an adhesion, to a surface of the magnetic disk, of an oil component or an ion which is present in an atmosphere in the magnetic disk device such as an HDD and other chemical substances.

Examples of the hydrocarbon based silane agent include a compound shown in the following general formula (I), for example:

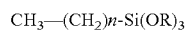

$$CH_3-(CH_2)n\text{-}Si(OR)_3$$

wherein R represents a hydrogen atom, an alkyl group such as $-CH_3$ or $-CH_2CH_3$, or a halogen group such as Cl.

By changing a length of an alkyl main chain of the compound (the value of n), moreover, it is possible to regulate the film thickness of the lubricating layer which is formed. In order to obtain a film thickness having an excellent lubricating property, n preferably ranges from approximately 3 to 20 and further preferably ranges from approximately 7 to 18.

Furthermore, a preferable range of n is approximately 10 to 17 in respect of an enhancement in a heat resistance.

In the case in which the compound is formed as the lubricating layer on the protecting layer, moreover, silane groups are on a side (an anchor) to be bonded (chemically bonded) to the protecting layer and CH3 groups are an end on the opposite side and a surface of the lubricating layer can be set to have a low energy.

On the other hand, examples of the partial fluorinated hydrocarbon based silane agent includes a compound shown in the following general formula (II):

$$CF_3(CF_2)m(CH_2)n\text{-}Si(OR)_3$$

wherein R represents a hydrogen atom, an alkyl group such as $-CH_3$ or $-CH_2CH_3$, or a halogen group such as Cl.

By changing lengths of alkyl main chains (the values of n and m) in the compound, similarly, it is possible to regulate a film thickness of a lubricating layer to be formed. In order to obtain a film thickness having an excellent lubricating property, (n+m) preferably ranges from approximately 3 to 20 and more preferably ranges from approximately 7 to 18.

In respect of an enhancement in the heat resistance, moreover, it is preferable that n should range from 2 to 5 and m should range from 5 to 18.

In the case in which the compound is formed as the lubricating layer on the protecting layer, moreover, silane groups are on a side (an anchor) to be bonded (chemically bonded) to the protecting layer and carbon fluoride groups such as $-CF_3$ are an end on the opposite side and a surface of the lubricating layer can be set to have a low energy.

In order to form a lubricating layer constituted by a self assembly monolayer using the hydrocarbon based silane agent or the partial fluorinated hydrocarbon based silane agent, for example, it is preferable to employ a method of sequentially forming a magnetic layer and a protecting layer on a substrate and then immersing the substrate having the magnetic layer and the protecting layer formed thereon in a solution obtained by dispersing and dissolving the hydrocarbon based silane agent or the partial fluorinated hydrocarbon based silane agent into a proper solvent to carry out a reaction for a certain time, thereby forming a lubricating layer on the protecting layer.

As a solvent of the hydrocarbon based silane agent shown in the general formula (I) or the partial fluorinated hydrocarbon based silane agent shown in the general formula (II), for example, it is possible to use a fluorine based solvent (such as Vertrel (trade name)).

A concentration of the solution and a temperature thereof are optional. Moreover, a time required for immersing the substrate having the magnetic layer and the protecting layer formed thereon in a solution containing the hydrocarbon based silane agent or the partial fluorinated hydrocarbon based silane agent to cause them to react to each other is preferably equal to a time required for sufficiently forming the monolayer on the protecting layer.

According to the method of forming the lubricating layer, the formation of the lubricating layer can be controlled more easily and a more uniform lubricating layer can be formed on the surface of the magnetic disk as compared with the conventional art. In other words, the lubricating layer to be formed is an organic monolayer, the formation of the lubricating layer can be controlled accurately, and furthermore, the lubricating layer to be formed is a monolayer. As compared with the case in which the lubricating layer is formed by using a conventional perfluoropolyether based lubricant, the uniformity of the lubricating layer is guaranteed more greatly. As described above, for example, it is possible to control the film thickness of the lubricating layer by varying the length of the main chain of the hydrocarbon based silane agent or the partial fluorinated hydrocarbon based silane agent. Since a lubricating layer having an equal film thickness is formed by the monolayer, however, it is possible to guarantee a stable operation also on a recent condition of an ultra low floating amount of 10 nm or less, for example.

Furthermore, it is possible to perfectly cover the surface of the protecting layer to be a ground, thereby forming a lubricating layer having a very high coverage of the lubricating layer. It is indicated that the surface of the magnetic disk is covered with the lubricating layer more uniformly when the coverage of the lubricating layer is higher, and a head crush failure and a corrosion failure can be suppressed.

More specifically, when the coverage of the lubricating layer is increased, the surface of the magnetic disk is guarded more greatly and a degree of exposure of the surface of the protecting layer is reduced. Therefore, it is possible to obtain a high lubricating performance of the surface of the magnetic disk and to guard the surface of the magnetic disk from a substance which is apt to cause the corrosion failure or a fly stiction failure, for example, an acidic contaminant or a siloxane based contaminant which is present in an atmosphere in a magnetic disk device.

FIG. 1 is a schematic view showing an image of the lubricating layer formed on the protecting layer according to the present invention.

In the case where a lubricating layer constituted by a self assembly monolayer is formed by using the hydrocarbon based silane agent shown in the general formula (I) or the partial fluorinated hydrocarbon based silane agent shown in the general formula (II), for example, silane groups of an anchor are bonded (chemically bonded) to the protecting layer and the end on the opposite side to the anchor is formed toward the surface of the lubricating layer, and main chain (alkyl chain) portions of the respective molecules interact by a molecular force through the Van der Waals force in a transverse direction shown in the drawing.

As the protecting layer according to the present invention, a carbon based protecting layer can be used. In particular, an amorphous carbon protecting layer is preferred.

In the case in which the carbon based protecting layer is used in the present invention, it is possible to form a film through a DC magnetron sputtering method, for example.

Moreover, it is also preferable to use an amorphous carbon protecting layer formed by a plasma CVD method.

When the film is formed through the plasma CVD method, the surface of the protecting layer is made uniform so that the film is formed densely.

Accordingly, it is preferable to form the lubricating layer according to the present invention on the protecting layer formed thorough the CVD method which has a smaller roughness. In particular, it is suitable to use an amorphous carbon hydride protecting layer formed through the plasma CVD method.

In the present invention, it is preferable that the substrate should be a glass substrate. Since the glass substrate has a rigidity and is excellent in a smoothness, it is suitable for an increase in a recording density. Examples of the glass substrate include an aluminosilicate glass substrate, and an aluminosilicate glass substrate subjected to chemical strengthening is particularly suitable.

Moreover, it is also possible to form a texture shape (such as a circumferential texture) on a main surface of the glass substrate in order to enhance a magnetic anisotropy of a magnetic layer, for example. For instance, in order to form the circumferential texture, it is possible to propose a method of pressing a polishing tape formed by a proper material against the main surface of the glass substrate, thereby moving the glass substrate and the tape relatively.

In the present invention, it is preferable that the main surface of the substrate should be very smooth in a roughness having Rmax of 6 nm or less and Ra of 0.6 nm or less. Rmax and Ra are based on provisions of JIS B0601.

While the magnetic disk according to the present invention comprises at least the magnetic layer, the protecting layer and the lubricating layer on the substrate, the magnetic layer is not particularly restricted in the present invention but a magnetic layer for an in-plane recording system and a magnetic layer for a vertical recording system may be used. Above all, a CoPt based magnetic layer is suitable because it is possible to obtain a high coercive force and a high reproducing output.

In the magnetic disk according to the present invention, it is possible to provide a ground layer between the substrate and the magnetic layer, if necessary.

Moreover, it is also possible to provide a bonding layer or a soft magnetic layer between the ground layer and the substrate.

In this case, examples of the ground layer include a Cr layer, a Ta layer and an Ru layer, or an alloy layer including CrMo, CoW, CrW, CrV and CrTi, and examples of the bonding layer include an alloy layer including CrTi, NiAl and AlRu. Moreover, examples of the soft magnetic layer include a CoZrTa alloy film.

The magnetic disk according to the present invention is particularly suitable for a magnetic disk to be loaded onto a magnetic disk device using a load unload system.

EXAMPLE

The present invention will be more specifically described below with reference to examples.

Example 1

Figure 2:
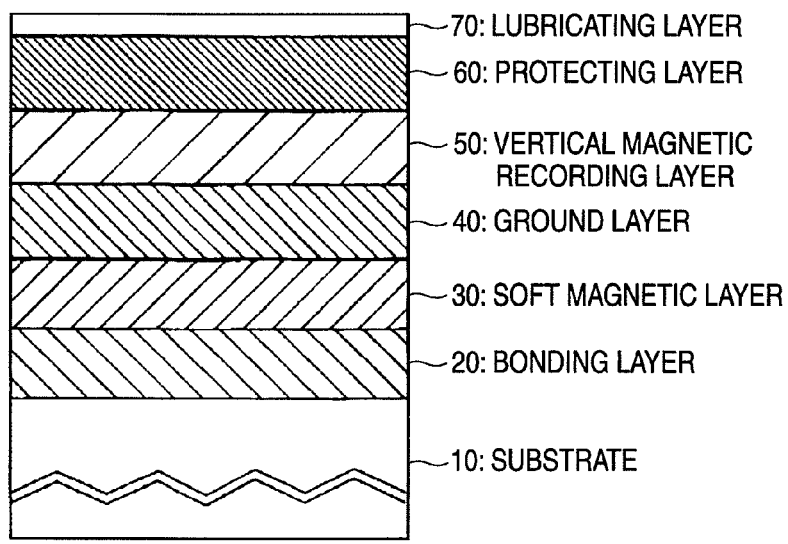
FIG. 2 is a schematic sectional view showing an embodiment of a magnetic disk according to the present invention.

FIG. 2 shows a magnetic disk according to an embodiment of the present invention, In the magnetic disk, a bonding layer 20, a soft magnetic layer 30, a ground layer 40, a vertical magnetic recording layer 50, a protecting layer 60 and a lubricating layer 70 are sequentially formed on a substrate 10.

Manufacture of Magnetic Disk

A 2.5 inch type glass disk (an outside diameter of 65 mm, an inside diameter of 20 mm, a disk thickness of 0.635 mm) formed by an aluminosilicate glass subjected to chemical strengthening was prepared and set as the disk substrate 10.

A main surface of the disk substrate 1 is mirror polished to have Rrnax of 4.8 nm and Ra of 0.43 nm.

The bonding layer 20, the soft magnetic layer 30, the ground layer 40 and the vertical magnetic recording layer 50 were sequentially formed on the disk substrate 10 in an Ar gas atmosphere through a DC magnetron sputtering method. For the bonding layer 20, a CrTi alloy film (Cr: 50 atomic %, Ti: 50 atomic %) was formed in a thickness of 200 Å.

For the soft magnetic layer 30, a CoZrTa alloy film (Co: 88 atomic %, Zr: 5 atomic %, Ta: 7 atomic %) was formed in a thickness of 500 Å.

For the ground layer 40, a Ta film and an Ru film were layered in a thickness of 300 Å.

For the vertical magnetic recording layer 50, a CoCrPt alloy film (Co: 62 atomic %, Cr: 20 atomic %, Pt: 18 atomic %) was formed in a thickness of 200 Å.

Next, the protecting layer 60 formed by layering diamond-like carbon hydride and diamondlike carbon nitride was formed in a thickness of 25 Å through a plasma CVD method.

Then, the lubricating layer 70 was formed in the following manner.

As a pretreatment, the magnetic disk provided with the protecting layer 60 was subjected to ultrasonic cleaning in ultrapure water or ultrasonic cleaning in alcohol and was then dried.

A solution obtained by dissolving a compound represented by $CH_3(CH_2)_{17}Si(OCH_3)_3$ for a hydrocarbon based silane agent in a concentration of 0.1% in an alcoholic solvent was controlled and the magnetic disk subjected to the pretreatment was immersed in the solution, they are caused to react to each other for a certain time, and the magnetic disk was then pulled up from the solution and the residual solution was cleaned using an alcoholic solvent or a hydrocarbon based solvent. Thus, the lubricating layer 70 was formed.

A film thickness of the lubricating layer 70 was measured by a Fourier transform infrared spectrophotometer (FTIR) or an ellipsometry. As a result, the film thickness was 20 Å.

Thus, the magnetic disk according to the example was obtained.

Next, the magnetic disk according to the example was evaluated by the following testing method Evaluation of Magnetic Disk First of all, the surface of the lubricating layer was observed through an OSA (Optical Surface Analyzer) in order to evaluate a uniformity of the lubricating layer. As a result, an unevenness of the lubricating layer was not observed.

Next, coverage of the lubricating layer was evaluated.

The coverage of the lubricating layer was measured by an X-ray photoelectron spectrometry disclosed in U.S. Pat. No. 6,099,981. It is indicated that the surface of the magnetic disk is covered with the lubricating layer more uniformly when the coverage of the lubricating layer is higher. In the magnetic disk according to the example, the coverage of the lubricating layer had a very great value of 99% or more. In the case where a conventional perfluoropolyether based lubricant is formed by a dipping method, the coverage of the lubricating layer of 70% or more is generally preferable. Therefore, it is apparent that the magnetic disk according to the example has a very high coverage of the lubricating layer and exhibits a suitable property.

Next, a contact angle with respect to the solvent in the surface of the lubricating layer was measured. The measurement of the contact angle was carried out through the CECIL method. As a result, it was found that a contact angle with respect to water has a great numeric value of 105.6° and a high water repellency and a low energy surface is formed through the lubricating layer in the magnetic disk according to the example.

Next, an LUL (load unload) durability test was carried out in order to check an LUL durability of the magnetic disk thus obtained.

An HDD (hard disk drive) using an LUL system (a 5400 rpm rotation type) was prepared, and a magnetic head having a floating amount of 10 nm and a magnetic disk were loaded. A slider of the magnetic head is an NPAB slider and a reproducing device loads a magnetoresistive effect element (a GMR element).

A shielding portion is an FeNi based permeability alloy. The LUL system HDD was caused to repeat a continuous LUL operation and there was measured the number of times of LUL at which the magnetic disk was endured before the generation of a failure.

As a result, the magnetic disk according to the example endured 900000 LUL operations without failure in a very low floating amount of 10 nm. In a use environment of an ordinary HDD, particularly, endurance to 600000 LUL operations or more is suitable. Therefore, it is apparent that the magnetic disk according to the example has a very high reliability.

During the test, moreover, a fly stiction phenomenon was not generated.

The surface of the magnetic disk and that of the magnetic head were observed in detail through a light microscope and an electron microscope after the LUL durability test. However, an abnormality such as a scratch or dirt was not observed and neither an adhesion of the lubricant to the magnetic head nor a corrosion failure were observed, and thus the surfaces were excellent.

Example 2

A magnetic disk according to an example 2 was manufactured in almost the same manner as in the example 1 in that a compound represented by $CF_3(CH_2)_{17}Si(OCH_3)_3$ was used as a partial fluorinated hydrocarbon based silane agent for a lubricating layer.

In the same manner as in the example 1, the magnetic disk was evaluated. As a result, an unevenness of the lubricating layer was not observed through an OSA and coverage of a lubricant had a very great value of 99% or more.

In a measurement of a contact angle with respect to a solvent on the surface of the lubricating layer, moreover, the magnetic disk according to the example had a contact angle of 107° with respect to water and a contact angle of 68° with respect to a nonpolar solvent, both of which were great numeric values, and it was found that a low energy surface is formed by the lubricating layer.

Furthermore, an LUL durability test was carried out. As a result, the magnetic disk according to the example endured 900000 LUL operations without failure in a very low floating amount of 10 nm. During the test, moreover, a fly stiction phenomenon was not generated. The surface of the magnetic disk and that of the magnetic head were observed in detail through a light microscope and an electron microscope after the LUL durability test. However, an abnormality such as a scratch or dirt was not observed and neither an adhesion of the lubricant to the magnetic head nor a corrosion failure were observed, and thus the surfaces were excellent.

Description will be given to methods of identifying an SAM (self assembly monolayer).

Both of the identifying methods utilize such a feature that the SAM is a film having an anchor portion, that is, a chemical bonding portion to a protecting layer and has an orientation by the Van der Waals force between alkyl chains.

First Identifying Method

Since an element on an opposite side to an anchor (CH3 with a hydrocarbon based anchor and CF3 with a fluorine based anchor) is always present on an uppermost surface. Therefore, the element of the SAM is detected in a vertical direction through an XPS (ESCA). Similarly, an anchor element (Si in the example) is present in a position having a certain depth. By detecting them, it is indicated that the analyzed film has an orientation.

In an ordinary film, the element has no specific distribution in a vertical direction and is detected at a certain rate.

Second Identifying Method

Because of the orientation of a molecule, an analysis is carried out through a polarized infrared absorption. Consequently, it is apparent that the molecule has an orientation with respect to a surface. In an ordinary film, a bonding direction is random. Therefore, a selectivity of the absorption cannot be observed depending on a type of the polarization.

With the first identifying method or the second identifying method, accordingly, it is possible to analyze the feature of the SAM and to identify the SAM.

Comparative Example

In the comparative example, FOMBLIN Z Doll (trade name) manufactured by Solvay Solexis Co., Ltd., which is a conventional perfluoropolyether based lubricant, is subjected to molecular cutoff through a GPC method to have Mw of 3000 and a degree of molecular weight dispersion of 1.08, and is used as a lubricant. This lubricant was dispersed and dissolved in a fluorine based solvent Vertrel XF (trade name), which is manufactured by DUPONT-MITSUI FLUOROCHEMICALS COMPANY, LTD., in a concentration of 0.02% by weight to control the solution.

The solution was used as a coating solution and a magnetic disk having a protecting layer thereon was immersed therein, and was coated through a dipping method to form a lubricating layer.

A film thickness of the lubricating layer was measured as 10 Å through an FTIR. The other respects are the same as those in the example 1 and the magnetic disk thus manufactured was set to be a comparative example.

In the same manner as in the example 1, the magnetic disk was evaluated. In an observation carried out through an OSA, it could be observed that the lubricating layer has a slight unevenness. Although coverage of a lubricant was 75%, it was a much smaller value as compared with the magnetic disks according to the examples 1 and 2. In a measurement of a contact angle with respect to a solvent on a surface of the lubricating layer, moreover, it was found that the magnetic disk according to the comparative example has a contact angle of 93.2° with respect to water, and has a smaller value of the contact angle than that in each of the magnetic disks according to the examples 1 and 2 and has a high surface energy.

Furthermore, an LUL durability test was carried out. As a result, the magnetic disk according to the comparative example was broken down at a number of LUL operations of 500000. After the test, the magnetic head was taken out and checked. Consequently, a transfer and a corrosion failure of the lubricant were observed in an NPAB pocket portion and an ABS surface of the magnetic head, and a dirt adhesion was observed over the surface of the magnetic disk.

INDUSTRIAL APPLICABILITY

According to the present invention, in the magnetic disk including a magnetic layer, a protecting layer and a lubricating layer on a substrate, the lubricating layer is formed by a self assembly monolayer. Therefore, it is possible to accurately control a film thickness of the lubricating layer and to have a high uniformity of the film and a high durability. Consequently, a long-term reliability is high and thus an industrial applicability is very great.

The invention claimed is:

1. A method of manufacturing a magnetic disk having a substrate, a magnetic layer, a protecting layer and a lubricating layer on the substrate, comprising the steps of:

forming the magnetic layer and the protecting layer sequentially on the substrate; and immersing the substrate on which the magnetic layer and the protecting layer are formed in a solution containing a hydrocarbon-based silane agent or a partial fluorinated hydrocarbon-based silane agent, thereby forming a lubricating layer on the protecting layer;

wherein the hydrocarbon-based silane agent is represented by the following general formula (I):

$$CH_3-(CH_2)_n-Si(OR)_3 \qquad (I)$$

wherein R represents a hydrogen atom, an alkyl group or a halogen group; and n represents an integer from 3 to 20; and the partial fluorinated hydrocarbon-based silane agent is represented by the following general formula (II):

$$CF_3(CF_2)_m(CH_2)_n-Si(OR)_3 \qquad (II)$$

wherein R represents a hydrogen atom, an alkyl group or a halogen group; and n+m represents an integer from 3 to 20.

2. The method of manufacturing a magnetic disk according to claim 1, wherein n represents an integer from 10 to 17 in general formula (I).

3. The method of manufacturing a magnetic disk according to claim 1, wherein n+m represents an integer from 7 to 18 in general formula (II).

4. The method of manufacturing a magnetic disk according to claim 1, wherein a time required for immersing the substrate in the solution containing the hydrocarbon-based silane agent or the partial fluorinated hydrocarbon-based silane agent is equal to a time required for forming the lubricating layer on the protecting layer.

* * * * *